US008000479B2

(12) United States Patent
Suber, III

(10) Patent No.: US 8,000,479 B2

(45) Date of Patent: Aug. 16, 2011

(54) WIRELESS SPEAKER ADAPTER

(75) Inventor: Edward H. Suber, III, Akron, OH (US)

(73) Assignee: Edward H. Suber, III, Akron, OH (US)

( * ) Notice: Subject to any disclaimer, the term of this patent is extended or adjusted under 35 U.S.C. 154(b) by 880 days.

(21) Appl. No.: 12/009,500

(22) Filed: Jan. 19, 2008

(65) Prior Publication Data

US 2008/0181425 A1 Jul. 31, 2008

Related U.S. Application Data

(60) Provisional application No. 60/881,016, filed on Jan. 19, 2007.

(51) Int. Cl.
*H04B 3/00* (2006.01)

(52) U.S. Cl. .......... 381/77

(58) Field of Classification Search .......... 381/77
See application file for complete search history.

(56) References Cited

U.S. PATENT DOCUMENTS

| | | | | |
|---|---|---|---|---|
| 7,818,037 | B2 * | 10/2010 | Lair et al. | 455/575.2 |
| 2004/0208325 | A1 * | 10/2004 | Cheung et al. | 381/79 |
| 2006/0143014 | A1 * | 6/2006 | Cheng et al. | 704/270 |
| 2006/0229100 | A1 * | 10/2006 | Born | 455/557 |
| 2007/0004464 | A1 * | 1/2007 | Lair et al. | 455/569.1 |
| 2007/0092088 | A1 * | 4/2007 | Chang | 381/79 |
| 2007/0155366 | A1 * | 7/2007 | Manohar et al. | 455/411 |
| 2007/0202950 | A1 * | 8/2007 | Hussaini et al. | 463/39 |
| 2009/0007185 | A1 * | 1/2009 | Nix et al. | 725/62 |

* cited by examiner

*Primary Examiner* — Thao P. Le

(57) ABSTRACT

The instant abstract is neither intended to define the invention disclosed in this specification nor intended to limit the scope of the invention in any way. An apparatus is provided that can adapt a conventional audio playing device and speaker system to wireless operation. The apparatus will include a wireless transmitter/receiver system to be integrated with other conventional audio and speaker systems and can also transmit multiple individual channels on different frequencies to a plurality of receiver modules.

9 Claims, 1 Drawing Sheet

WIRELESS SPEAKER ADAPTER

1. CLAIM FOR PRIORITY

This application claims priority of application No. 60/881,016 filed on Jan. 19, 2007 titled Wireless Speaker Adapter.

BACKGROUND OF THE INVENTION

1. Field of the Invention

This invention relates to a wireless audio speakers and, more specifically, to a system of adapting otherwise conventional audio playing devices and speakers to wireless operation.

2. Description of the Related Art

Current home entertainment systems generally require their speakers to be hard-wired back to the main system components. An important part of achieving the best performance of these systems is the multiple speakers they require. While in the past, two speakers were used for a stereo program, today's programming often requires three, five, seven or even more speakers for top end home theater systems. As more speakers are required, wiring complexity increases accordingly, and the drawbacks of finding places for and installing wiring in an manner that is not unsightly becomes increasingly important.

The drawbacks of hard-wired systems have been addressed in part by home entertainment systems including wireless speaker systems. However, while devices exist for servicing individual audio channels, nowhere is there available a wireless transmitter designed to transmit sound from a 5.1 or 7.1 or similar audio scheme in an integrated, comprehensive manner to a plurality of individual wireless receiver modules.

A search of the prior art did not disclose any patents that read directly on the claims of the instant invention; however, the following references were considered related.

U.S. Pat. RE 38,405 issued in the name of Clair, Jr., et al., discloses an audio enhancement system and method of use with a sound system for producing primary sound from at least one main loudspeaker located at a main position. The audio enhancement system comprises at least one wireless transmitter, time delay circuitry, and plural augmented sound producing subsystems. Each sound subsystem is a portable unit arranged to be carried by a person located remote form the main loudspeaker and includes a wireless receiver and an associated transducer device, e.g., a pair of stereo headphones. The transmitter broadcasts an electrical signal which is representative of the electrical input signal provided to the main loudspeaker. The broadcast signal is receiver by the receiver and is demodulated and amplified to drive the transducer so that it produces augmented sound substantially in synchronism with the sound arriving from the main loudspeaker. To achieve that end, the time delay circuitry delays the electrical signal which is provided to the transducer for a predetermined period of time corresponding generally to the time period it takes for the primary sound to propagate through the air from the main loudspeaker to the remote location at which the person is located.

U.S. Pat. No. 4,829,500, issued in the name of Saunders, discloses a portable wireless sound reproduction system includes a first portable housing having a sound signal receiving circuit and controls for processing the sound signal into two signals for transmission by two separate sound signal transmitters located in the same housing. A pair of speakers is detachably connected to the first housing and includes receivers for receiving the wireless transmission of signals from the transmitters. The two speakers and adapted to be disposed in side-by-relation with the first housing completely overlying and detachably connected to each of the speakers.

U.S. Pat. No. 6,487,296, issued in the name of Allen et al, discloses a wireless surround sound speaker system wherein a transmitter broadcasts a variety of FM signals that correspond to the individual speaker channels commonly found in a surround sound system. Receivers, individually equipped with signal receiving, conditioning and amplification components, are configured to receive any one of the broadcast signals in a remote location and are used to drive a conventional loudspeaker in that location. Powered by wall socket or via DC battery packs, the receivers, used in conjunction with the transmitter, provide surround sound capabilities without the need for complex and difficult wiring.

U.S. Pat. No. 7,024,003, issued in the name of Dupeire, discloses a wireless speaker system used in conjunction with a hard-wired audio system is provided. The wireless speaker system includes a wireless transmitter module including an input connected to a wired speaker output of a main component of the hard-wired audio system. The wireless transmitter module transmits an output signal of a predefined frequency carrying the output signal of the main component. A wireless receiver module including an output connected to the wired speaker input of the external speaker receives the output signal on the predefined frequency and the external speaker responds to the output signal.

Consequently, a need has been felt for providing an apparatus and method of adapting otherwise convention speakers to wireless use in conjunction with modern multichannel sound architecture.

SUMMARY OF THE INVENTION

It is therefore an object of the present invention to provide an improved wireless transmitter/receiver system for integration with otherwise conventional audio and speaker systems.

It is a feature of the present invention to provide an improved transmitter that can transmit multiple individual channels on different frequencies to a plurality of individual receiver modules.

Briefly according to the preferred embodiment of the present invention, a wireless speaker system suitable for a hard-wired audio system comprises a wireless transmitter module including an input harness for connection simultaneously to multiple speaker outputs of a main component of the hard-wired audio system. The wireless transmitter module transmits a plurality of individual output signals. Similarly, a plurality of wireless receiver modules is provided, each for receiving one of the predefined frequencies transmitted by the transmitter module.

In accordance with the preferred embodiment, a user can integrate some or all of the speakers in an otherwise conventional surround sound system to wireless operation.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT ACCORDING TO THE FIGURES

Figure 1:
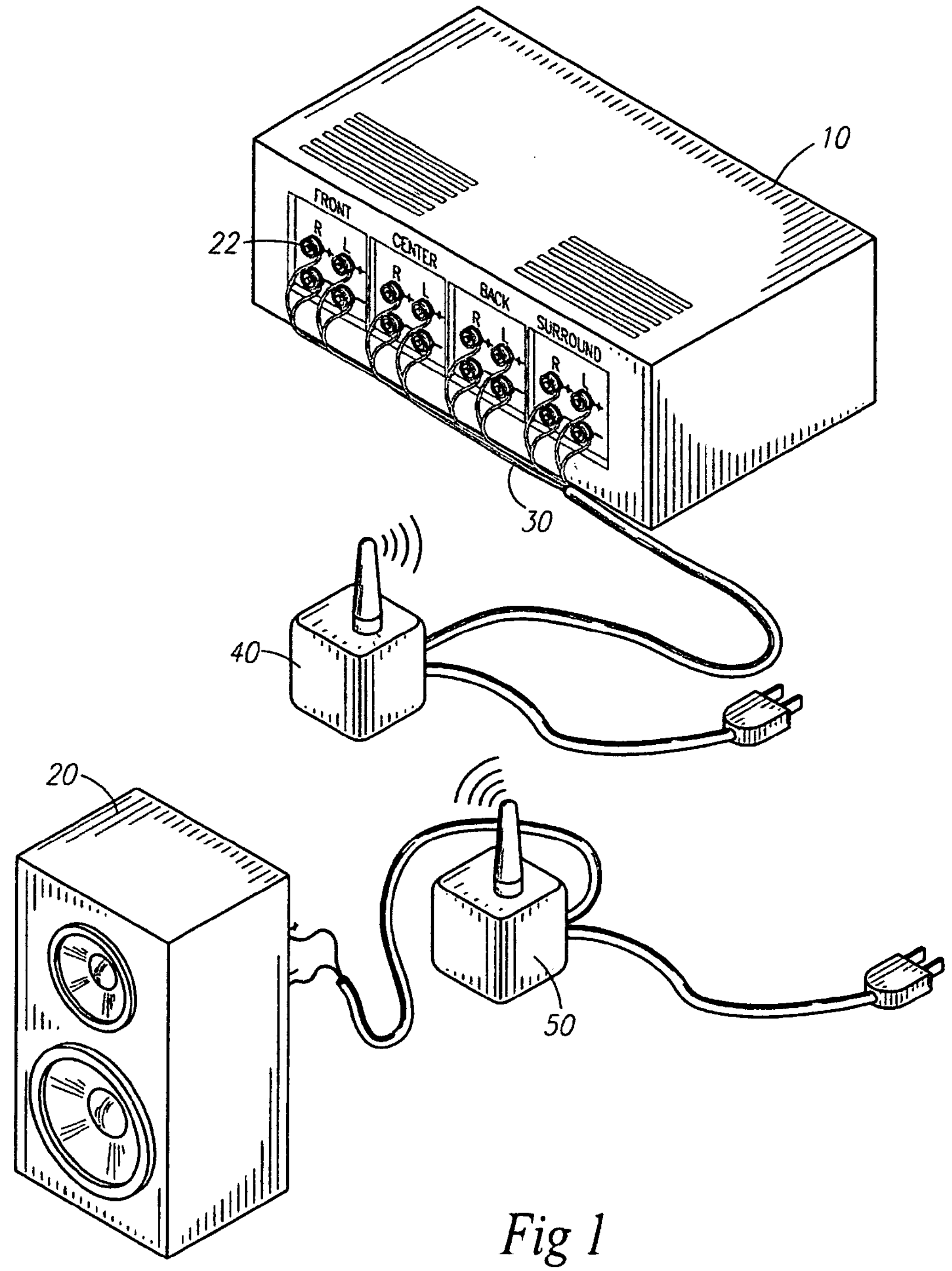
FIG. 1 is a block diagram of an exemplary wireless speaker system used un conjunction with a hard-wired audio system according to the present invention.

A wireless speaker system according to exemplary embodiments of the present invention is used in conjunction with an existing hard-wired audio system of which the main component 10 is originally designed for a wired connection to a number of individual speakers 20. In a conventional surround sound system such as a 4.1, 5.1, or 6.1, the number of individual speaker channels can be 5, 6, 7 or more. Each individual output for each channel is in electrical signal communication with a wiring harness 30. The wiring harness 30 is anticipated as being comprehensive enough to have enough conductors for each left or right band of all individual channels. However, it is anticipated that some of these conductors of the harness 30 may not be utilized, with the user opting to maintain some of the channels in their conventional hard-wired configuration.

The wiring harness 30 communicates to at east one, and up to a comprehensive array of signals to the wireless transmitter module 40. The transmitter module 40 transmits a plurality of individually coded output signals from the main component 10 on a series of predefined frequencies to a plurality of individual wireless receiver modules 50. Each receiver module 50 has a predefined signal frequency corresponding to one of the multiple channels transmitted by the transmitter module 40, such that a user is capable of selecting which particular individual speakers 20 are controlled by a particular output channel.

Thus, the wires (that connected between the main component and the external speakers) are eliminated by connecting the wireless transmitter module and the receiver module to the main component and the external speakers, respectively.

The wireless transmitter module 40 may have AC or DC power source, and may include a frequency, volume, balance, fade, tone or equalization adjustment. The wireless transmitter module 40 may further include an amplifier.

The hard-wired audio system 10 may generate separate output signals (left and right channel) to maintain the distinct sounds generated by each channel. In this case, the wireless transmitter module 40 transmits the output signals on separate frequencies from the hard-wired audio system 10 to the left and right wireless receiver modules 50 by means of radio, infrared or other wireless transmission technology.

Similarly, each wireless receiver module 50 may have AC or DC power source, and include features such as frequency, volume, balance, fade, tone and equalization adjustments.

According to the exemplary embodiments of the invention, using external speakers for a hard-wired audio system does not require that wires be run to each external speaker. Further, the wireless speaker system according to the exemplary embodiments of the invention has the cost benefit associated with the reuse of existing audio systems, because the complete replacement of the existing audio system is not needed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular us contemplated. It is intended that the scope of the invention be defined by the claims appended hereto and their equivalents. Therefore, the scope of the invention is to be limited only by the following claims.

The invention claimed is:

1. A wireless speaker adapter system suitable for use with an otherwise conventional hard-wired audio system, comprising:

a wireless transmitter module including a plurality of inputs for connection to a wired speaker output of a main component of the hard-wired audio system, the wireless transmitter module transmitting multiple individual output signal of a predefined individual frequencies;

a wiring harness for electrically communicating a plurality of audio signals from said conventional hard-wired audio system to said wireless transmitter module; and a plurality of wireless receiver modules, each communicating with one said predefined frequency of said wireless transmitter module.

2. The system of claim 1, wherein the wireless transmitter module includes AC or DC power source or battery operated.

3. The system of claim 1, wherein each said receiver module includes AC or DC power source.

4. The system of claim 1, wherein the wireless transmitter module includes a frequency, volume, balance, fade, tone or equalization adjustment.

5. The system of claim 4, wherein the wireless transmitter or receiver includes an amplifier.

6. The system of claim 1, wherein each said wireless receiver modules includes a frequency, volume, balance, fade, tone or equalization adjustment.

7. The system of claim 1, wherein the main component of the hard-wired audio system includes left and right channels, the first output signal corresponding to the left channel and the second output signal corresponding to the right channel.

8. The system of claim 1, wherein the wireless transmitter module transmits the output signals to a plurality of wireless receiver modules by radio, infrared or any other method of transmission.

9. The system of claim 1, wherein the wireless transmitter and receiver modules may be used as a single system for one wireless speaker, or for a multiple wireless speaker setup.

* * * * *